United States Patent
Deprot et al.

(10) Patent No.: US 7,254,963 B2
(45) Date of Patent: Aug. 14, 2007

(54) METHOD AND DEVICE FOR CONTINUOUS PRODUCTION OF GLASS-SHEATHED METAL WIRES

(75) Inventors: Sylvie Deprot, Tours (FR); Olivier Acher, Monts (FR); Frederic Bertin, Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 582 days.

(21) Appl. No.: 10/474,656

(22) PCT Filed: Apr. 16, 2002

(86) PCT No.: PCT/FR02/01305

§ 371 (c)(1),
(2), (4) Date: Oct. 14, 2003

(87) PCT Pub. No.: WO02/083584

PCT Pub. Date: Oct. 24, 2002

(65) Prior Publication Data

US 2004/0103690 A1    Jun. 3, 2004

(30) Foreign Application Priority Data

Apr. 18, 2001  (FR) .................................. 01 05243

(51) Int. Cl.
*C03C 27/02* (2006.01)

(52) U.S. Cl. ........................... 65/444; 65/59.1; 65/59.6

(58) Field of Classification Search ................. 65/59.1, 65/59.27, 59.35, 59.6, 146, 147, 442, 444
See application file for complete search history.

(56) References Cited

U.S. PATENT DOCUMENTS

| 3,214,805 A | 11/1965 | McKenica |
| 3,294,504 A | 12/1966 | Hicks, Jr. |
| 3,481,390 A | 12/1969 | Veltri et al. |
| 4,311,506 A * | 1/1982 | Manfre' et al. ............... 65/59.6 |

* cited by examiner

*Primary Examiner*—Steven P. Griffin
*Assistant Examiner*—Queenie Dehghan
(74) *Attorney, Agent, or Firm*—Pearne & Gordon LLP

(57) ABSTRACT

The device and process allow for continuous processing of metal wire sheathed in glass (10) of considerable length.

Figure 1:
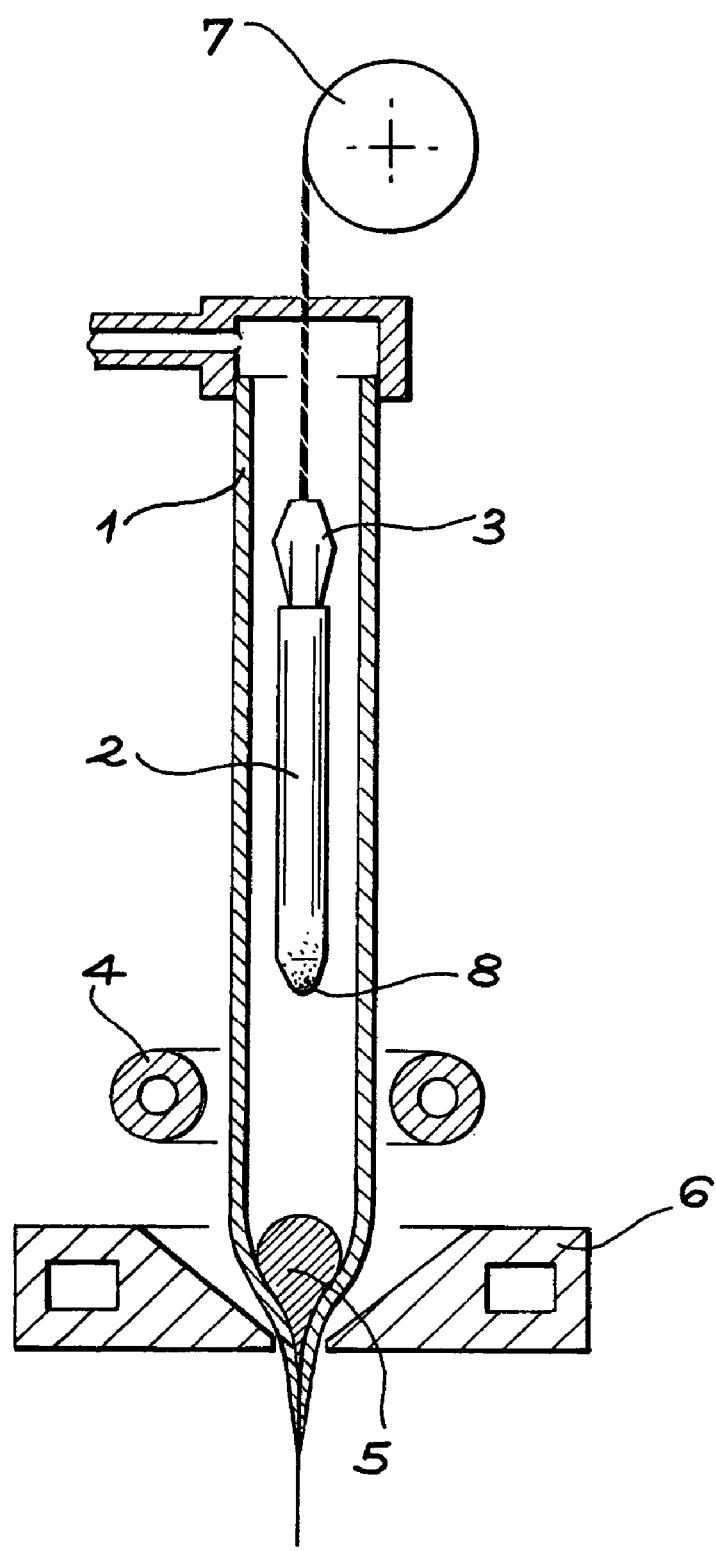

Normally a feed pipe (15) containing all the necessary metal, itself placed into a glass tube (20), so as to continuously supply a bead (14) to the lower part of the glass tube (20). Heat from a first inductor (23) around the glass tube (20) and a second inductor (24) under the glass tube (20) allow to maintain a bead (14) at a stable temperature and in a continuous manner and to obtain the continuous drawing process of a metal wire sheathed in glass (10).

8 Claims, 2 Drawing Sheets

METHOD AND DEVICE FOR CONTINUOUS PRODUCTION OF GLASS-SHEATHED METAL WIRES

FIELD OF THE INVENTION

This invention relates to the continuous processing of metal wires sheathed in glass, and in particular when the two constitutive materials of the wire are heated and partially melted so as to be continuously drawn into their definitive shape.

Prior Art and Posed Problem

All of the prior art processes, for continuous processing of metal wire sheathed in glass, are based on an elaborate process described, initially, by Taylor in 1924. It consists of the following principle.

Firstly, a certain amount of metal is inserted into a glass tube closed at its base. The lower part of this tube is placed close to a high-frequency inductor, which results in the melting of the metal inside the glass tube. The glass softens through thermal conduction. The casting process of the microfilament, composed of a metal wire inside a glass tube, is manually initiated using a capillary tube. The initiated wire is then placed on a revolving drum, so as to continuously draw the component made of metal surrounded with glass. The wires, whose total diameter can vary between 6 and 25 µm, with a metal core varying from 2 to 18 µm, are often obtained via this shaping process.

However, the main defect of this process is that it does not work in a continuous manner, as, if the mass of metal inserted into the tube is too great there is a risk of perforating the vitreous casing. Indeed, the coupling of the inductor with the metal is all the more important the greater the mass of the metal. Consequently, the importance of the softening of the lower part of the tube is directly dependent on the mass of molten metal in this tube.

The mass of metal that can in inserted into the glass tube is therefore limited, which forces the operator to split the casting process.

This inconvenience led to the development of this method. Thus, the Russian author's certificate, N° 1 088 075, describes a casting process of a microfilament inside insulating glass, diagrammatized in FIG. 1. It uses a glass tube 1 in which a bead 5 is produced destined to constitute the wire once the lower part of the glass tube 1 has softened upon contact with this bead 5. A first inductor 4, placed around the glass tube 1, heats a metal rod 2, placed inside the glass tube 1, using nose pliers 3, and lowered using a raising and lowering device 7. The heating of the metal rod 2 is designed so that an input bead 8 of molten metal is constantly suspended from the lower part of the rod 2, so as to regularly supply the bead 5 placed in the lower part of the glass tube 1, when it is being consumed too quickly. The lower inductor 6 allows maintaining the bead 5 in a molten state and thus carrying out the drawing of the metal wire sheathed in glass.

If the process allows some of the problems posed by the Taylor process to be resolved, for example in providing a reservoir of metal, allowing to realise a considerably length of wire without stopping the machine, it nevertheless has two inconveniences linked to the discontinuation of the supply of molten metal to the micro-melt constituted by the bead 5 and to the difficulty of controlling the input bead 8 at the lower end of the rod 2. Indeed, this input bead 8, of considerably mass compared to the bead 5, creates a brutal increase of the mass of the metal bath, resulting in the drawing of the softened part of the glass tube 1, as far as the zone with the highest magnetic intensity. The bath is thus brutally brought to a very high temperature, which brings about a change in the geometric characteristics of the wire. Additionally, the discontinuous melting of the rod 2, due to the several minute-long interval separating the creation of the two successive input beads 8 at the bottom of the rod, generates a periodic supply of non-homogeneous oxides in the bead 5, prejudicial to the homogeneity of the qualities of the metal wire. Indeed, some of these oxides whose melting point is higher will form inclusions often insoluble, which, brought into the metal wire creation zone, risk fracturing it.

Another solution is presented in the U.S. Pat. No. 3,362,803. It consists in filling the glass tube with the necessary amount of metal for the required length of metal wire, but then by melting only the metal at the lower part of the glass tube via induction. The upper part of the metal is pre-heated via an electric resistance to a temperature lower than that which would soften the glass or ceramic, but as the molten metal is a good heat conductor, the heat will propagate upwards. The glass, being in contact with the molten alloy, will soften at a height such that there will be a risk of breaking the glass tube due to the action of the mass of the molten metal contained therein.

The purpose of this invention is to resolve the problems posed by the devices and processes mentioned above.

On the other hand, through the documents of patent U.S. Pat. No. 3,481,390, a process is known allowing to work metals with a high melting temperature, which render the glass overly liquid, and of reactive metals which limit the type of materials that can be used to constitute the device. The process proposed in this document consists in melting the metal/metal alloy in a refractory crucible, totally inert compared to the latter. This crucible, whose base ends in a die, is placed into the glass tube, without coming into contact with it. A first means of heating are used to melt the alloy contained in the crucible and a second means are placed near the lower part of the glass tube to soften it, so as to initiate a glass capillary, from the latter. On the other hand, the device uses means allowing a pressure to be applied in the crucible to eject the liquid alloy through the orifice of the die, in the form of a stream of molten metal, in the direction of the moulded capillary. In this device, the metal coming out of the crucible falls between 2 and 15 cm, to reach, as late as possible, the glass tube, the metal having cooled down slightly. The contact between the molten metal and the glass last a very short time (contact time between 0.5 and 0.002 s) and solely on the capillary. Consequently, the process, implemented in document U.S. Pat. No. 3,481,390, is very different to the Taylor principle (no permanent beads, use of over pressure to eject the molten metal). Additionally, the wire obtained through the process implemented in this document generally has a diameter greater than 30 µm, while one of the purposes of the invention is to produce, at high speed, wire with a diameter less than 20 µm (speed greater than 10 m/s).

SUMMARY OF THE INVENTION

A first main objective of the invention is a continuous processing of metal wire sheathed in glass consisting in:
  inserting metal into a glass tube, which is movable;
  heating the metal until it melts inside the glass tube, so as to create a bead, thus allowing to soften the lower part of the glass tube; and drawing in a continuous manner the assembly comprising molten metal surrounded in glass, which came from the lower part of the glass tube, whilst slowly lowering the glass tube, as it is consumed through the drawing of the obtained sheathed wire.

According to the invention, a heat resistant feed pipe is used, which is immovable in respect to the glass tube and has an external diameter less than the internal diameter of the glass tube, being totally inert as regards the metal mass and not softening at the temperature the metal mass reaches, being placed inside the glass tube, filled with all of the metal needed to process a large quantity of metal wire sheathed in glass and bored with a nozzle at its lower part, this nozzle being at a set minor distance from the lower part of the glass tube, in contact with the proceeding bead, thus allowing the formation of the proceeding bead and the continuous supply of the latter, so that the dimensions of this proceeding be ad remain substantially constant during the drawing of the wire. Means of applying negative pressure on the feed pipe are used to retain the molten metal mass in the tube. The negative pressure is then released and regulated so as to provoke the start of the flowing of the molten metal via the nozzle and to control the continuous flow of the metal mass throughout the drawing.

It proved advantageous to flush an inert gas such as argon between the two tubes to minimise the quantity of oxides in the processed wire.

It is very beneficial to use these means (aforementioned gas flushing) to flush out and drain the inside of the feed pipe with an inert gas, prior to the melting of the bead.

A second main objective of the invention is a device for continuous processing of metal wire sheathed in glass, comprising:

a glass tube closed at its base, of set diameter, and means of heating to melt a metal mass placed inside the glass tube and to maintain a proceeding bead in a liquid state softening the lower part of the glass tube.

According to the invention, it comprises a feed pipe containing the metal mass, of an external diameter less than the internal diameter of the glass tube that does not soften at the operating temperature, this feed pipe, with a nozzle at its lower part, being placed inside the glass tube so as to place its nozzle very close to the glass tube;

means of moving the glass tube to make it progressively descend as it is consumed through the drawing of the wire; and means of applying negative pressure and flushing to create and manage a negative pressure on the inside of the feed pipe, so as to regulate and control the flow of the molten metal mass feeding the proceeding bead.

In the preferred embodiment of the means of heating, the latter comprise a first induction furnace whose coils surround the lower part of the feed pipe by several centimeters.

Preferably, that the means of heating the proceeding bead inside the glass tube comprise a second inductor, in the shape of a shell and placed below the lower part of the glass tube.

A circulation of argon is organised between the glass tube and the metal feed pipe and a cable gland joint is used at the upper part of the glass tube to create a leak-proof joint between it and the metal feed pipe.

The device is completed via means of flushing using an inert gas in the glass tube.

LIST OF FIGURES

The invention and its different characteristics will be better understood upon reading the following detailed description, along with the two figures which respectively represent:

FIG. 1, already described, a device according to prior art; and

Figure 2:
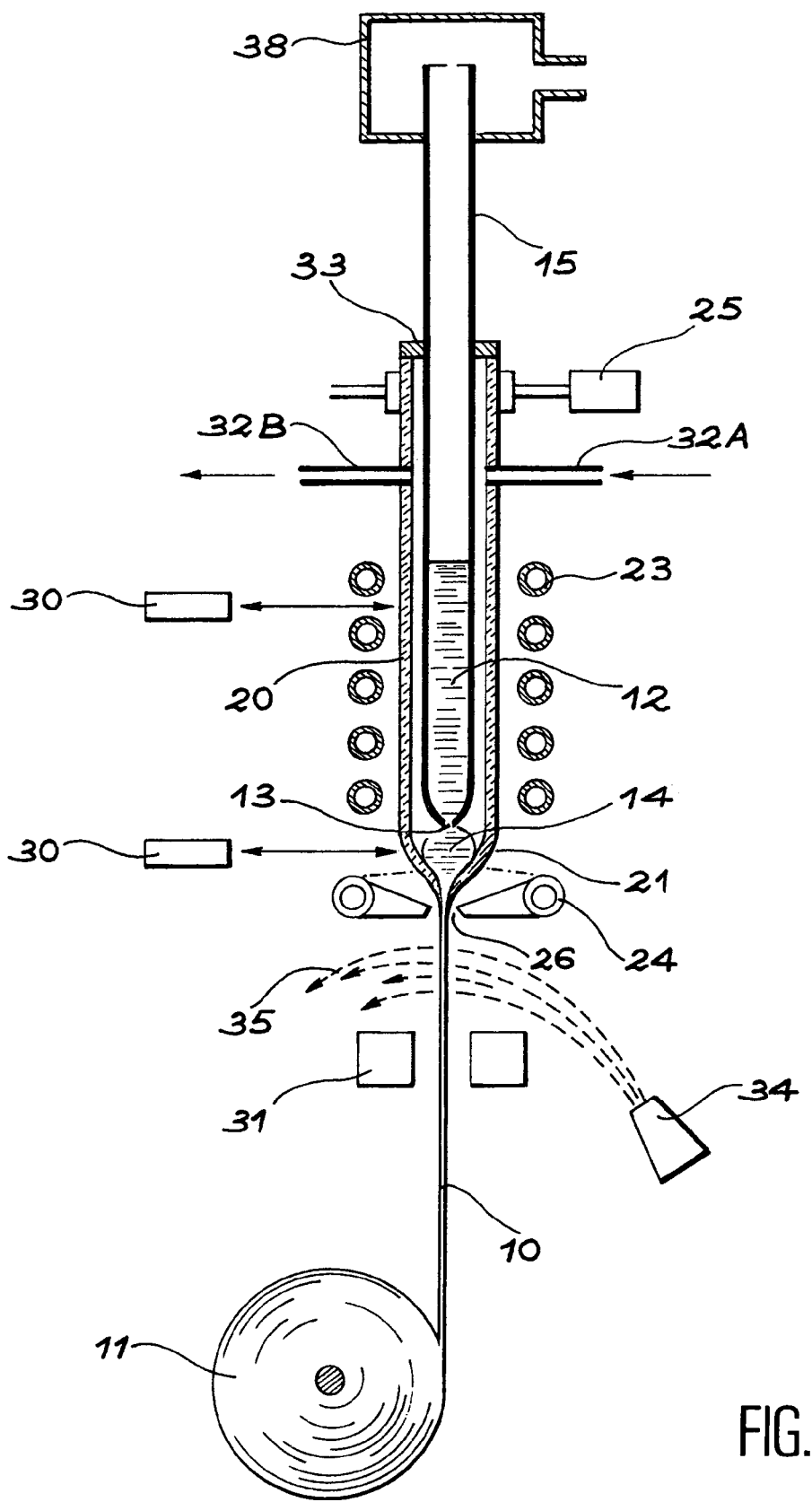

FIG. 2, a device according to the invention.

DETAILED DESCRIPTION OF AN EMBODIMENT OF THE INVENTION

In reference to FIG. 2, the device according to the invention uses the operational elements described in FIG. 1 and relative to the prior art. These are the glass tube 20, a first heating element comprised of an inductor 23, placed around the latter, a second means of heating comprised of a second inductor 24, placed under the lower part 21 of the glass tube 20, and means of flushing and applying negative pressure 38 inside the tube 15. To better explain the manufacturing process of metal wire sheathed in glass, the following secondary elements have been included in FIG. 2.

Temperature sensors, such as pyrometers 30 are placed next to the means of heating the glass tube 20 and next to the means of heating its lower part 21. A water jet device 34 sprays the sheathed metal wire 10 issuing from the drawing to rapidly cool it down. A wire diameter-measuring device 31 is placed downstream to the unit to control the diameter of the wire. Finally, a winding device 11, in the shape of a coil, stores the thus drawn 10 wire.

Depending on the melting temperature of metal alloys used to process the sheathed metal wire 10, different types of glass can be used to create the tube 20, such as borosilicate, aluminosilicate, silica at 96% or melted quartz glass. Ceramics can also be used. Additionally, the fact that the drawing temperature is 50 to 300° C. greater than that of the melting point of the metal must be taken into account. A progressive lowering device 25 allows the glass tube 20 to be gently lowered, as it is consumed through the drawing of the wire.

A major technical characteristic of the invention therefore consists in using a feed pipe 15 into which is placed, beforehand, all the metal mass 12 composed of metal or metal alloy. This feed pipe 15 can be composed of a refractory material, whose breakdown or deterioration temperature is greater than the operating temperature. It could be of quartz, for example, when it is desired to create amorphous or micro-crystallised alloys whose melting temperature is around 1,000° C. For alloys whose melting temperatures are higher it is possible to use alumina, boron nitride or titanium boride pipes.

This feed pipe 15, which is immovable, is therefore filled with the alloy or metal to be shaped otherwise unalloyed elements constituting an alloy. The metal mass 12 is brought to melting point by the coils of a first inductor 23 comprising a part of the means of heating. Indeed, the latter surrounds the feed pipe 15 at its lower part, thus creating a second heating zone, compared to the one in the device of FIG. 1, symbolising the prior art. The number of coils of the first inductor 23 depends on the height of the molten metal of the metal mass 12 that is desired to be obtained.

The inert gas flushing and negative pressure and flushing device 38 is therefore directly connected to an outlet above the feed pipe 15 to avoid, once the metal mass 12 has melted, the latter freely flowing through the lower nozzle 13 of the feed pipe 15. This lower nozzle is placed just above the lower part 21 of the glass tube 20. It is to be noted that the latter is also placed in relation to the second inductor 24, which is placed just below the lower part 21 of the glass tube 20, so as to adequately bring the proceeding bead 14 and the glass of the glass tube 20 to the appropriate temperature for drawing. The height of the nozzle 13, with regard to the lower part 21 of the glass tube 20, is lower than or level with the desired height of the bead 14, designated "proceeding bead" in the proceeding zone which is between the nozzle 13 of the feed pipe 15 and the lower part 21 of the glass tube 20. The height of the proceeding bead 14 sets the temperature range at the base of the glass tube 20 and the force applied by the weight of the proceeding bead 14 to the lower part 21 of the glass tube 20. In using the negative pressure and flushing device 38 it is possible to control the height of the proceeding bead 14. Additionally, in setting the temperature of the metal mass 12 in the feed pipe 15 to a value close to the temperature of the proceeding bead 14 any thermal imbalance will be avoided in the proceeding zone which is that of the proceeding bead 14.

It is also to be made clear that not only the mass and temperature of the proceeding bead 14 but also its shape influences the geometry and the qualities of the obtained sheathed wire. In the processes of the prior art, the metal in the glass tube essentially has the shape of a proceeding bead resembling an oblate spheroid. Through the use of a feed pipe 15 it is possible to control the shape of the proceeding bead 14, in particular the area in contact with the lower part 21 of the glass tube 20. For this purpose, the nozzle 13 can have several different shapes so as to obtain different results.

It is to be noted that, as the supply of molten metal is via a direct means in the proceeding zone, the possible presence of dross or molten glass floating on the surface of the proceeding bead 14 is of no consequence.

The second inductor 24, comprising the means of heating the proceeding bead 14 and placed under the lower part 21 of the glass tube 20, is comprised of one or several inductor coils. This second inductor 24 is placed next to the proceeding bead 14, preferably just below the lower part 21 of the glass tube 20, so as to maintain the proceeding bead 14 in sustenance, thanks to the buckling forces.

Thus, in the embodiment of FIG. 2, a flat, slightly curved, in the shape of a shell with a hole bored in its centre, the edges being raised from the central hole 26, single coil is used. The glass tube 20 is placed up to 10 mm above the central hole 26. In particular, the central hole 26 is located under the glass tube 20, its inside radius can be less than the radius of the glass tube 20. This allows to reduce the height of heating which is about the same as the inside radius of the coil. The heating energy is therefore concentrated on the proceeding bead 14.

The second inductor 24 can also be composed of several coils with a conical layout also allowing to carry out the sustenance of the proceeding bead 14. This sustenance implementation allows to avoid a sudden elongation of the glass tube 20, by reducing the force applied to the lower part 21 of the glass tube 20.

An infrared radiation furnace can also be used to constitute these means of heating the proceeding bead 14.

The inlet feeder 32A and the outlet feeder 32B allow to organise a circulation of argon between the glass tube 20 and the outside of the feed pipe 15. The sealing of this area is ensured by a cable gland joint 33 placed between the glass tube 20 and the feed pipe 15.

Remember that the glass tube 20 is movable compared to the feed pipe 15 and compared to the two inductors 23 and 24. In this way, as it is consumed through the drawing of the wire, the glass tube 20 is slowly lowered.

The process according to the invention is as follows.

All of the metal or metal alloy needed to process the sheathed wire 10 is inserted into the feed pipe 15, in the shape of ingots or powder. This metal mass 12 is heated by the first inductor 23 and melted inside the feed pipe 15.

Beforehand, the device is drained and pressurised with inert gas, in particular argon, prior to the melting of the metal. Thus, a flow of argon circulates in the feed pipe 15 towards the glass tube 20, thanks to the means of applying flushing and negative pressure 38 and to the inlet 32A and outlet 32B feeder. The nozzle 13 of the feed pipe 15 is not as yet obstructed by the molten metal.

The first inductor 23 heats the metal mass 12 and the flow of argon in the feed pipe 15 is stopped. Then, a negative pressure is created inside the feed pipe 15 to stop the molten metal mass 12 from freely flowing towards the lower part 21 of the glass tube 20. On the other hand, the argon flushing is still ensured inside the glass tube 20 and outside the feed pipe 15 thanks to the argon inlet 32A and outlet 32B feeders.

The negative pressure inside the feed pipe 15 is then reduced to allow the slow and continuous flow of the liquid metal mass 12 towards the lower part 21 of the glass tube 20, and this with a set flow rate of molten metal. The proceeding bead 14 then forms inside at the lower part 21 of the glass tube 20 whose dimensions and mass are controlled. The latter is, moreover, heated and maintained in a liquid state by the second inductor 24.

The supply process must progress without any dynamic disturbance. On the other hand, the metal mass of the proceeding bead 14 must not be too great so as to avoid excessive drawing of the softened glass of the lower part 21.

The mass of the proceeding bead 14 must be kept stable. Thus, the quantity of consumed metal through the drawing of the wire is constantly being replaced by the same quantity of metal coming from the feed pipe 15.

The temperatures of the molten metal mass 12 and of the proceeding bead 14 must be very close, so as to limit as much as possible the thermal disturbance.

It is thus possible to continuously process metal wire by introducing forty or so grams of CoFeNiMoSiB alloy into the feed pipe 15 made in quartz. The glass tube 20 can be made in borosilicate of type PYREX 7 740.

The second inductor 24 is a slightly curved single coil of 50 mm in diameter, bored with a hole 26 of 8 mm in diameter. The first inductor 23 can be composed of several coils of 20 mm in diameter over a height of 100 mm. This must be placed 20 mm above the second inductor 24, itself placed 10 mm below the lower part 21 of the glass tube 20.

The height of the glass tube 20 can be 500 mm, its inside diameter being 12.6 mm and the thickness of its wall being 1.2 mm.

The feed pipe 15 can be nearly 1 m high, with an outside diameter of 10 mm and an inside diameter of 8 mm. The nozzle 13 located at its lower part can be 1 mm in diameter. Of course, this feed pipe 15 is centred inside the glass tube 20 and positioned 10 mm above the lower part 21.

In this case, the temperature of the metal alloy is maintained at about 1,280° C. in the pipe 15 and tube 20. This temperature is controlled by two pyrometers 30. The mass of the proceeding bead 14 is about 5 g and its height about 10 mm.

The feeding rate of the glass tube 20 is set at 2.5 mm/min, the reeling rate at 10 m/s. The down speed of the level of molten metal mass 12 in the feed pipe 15 is 0.2 mm/min.

The drawn wire under these experimental conditions has a total diameter of 16 μm and a metal core of 5 μm.

In the same way, twenty or so grams of CoFeNbB alloy can be inserted into the feed pipe 15 with a total diameter of 8 mm and an inside diameter of 6 mm. The temperature of the metal alloy is maintained at 1,260° C. in the pipe 15 and tube 20. The feeding rate of the glass tube 20 is set at 2 mm/min, the reeling rate at 18 m/s. The down speed of the level of molten metal mass 12 in the feed pipe 15 is 0.75 mm/min.

The drawn wire under these conditions has a total diameter of 10 μm and a metal core of 5 μm. The reeling rate can be increased to values ranging from 20 to 80 m/s, on the basis that the down speed of the pipe is increased from 4 to 13 mm/min. For example, a wire with a total diameter of 9 μm and a metal core of 4 μm can be obtained.

In all cases, upon exiting the second inductor 24, the sheathed metal wire is drawn and then soaked by the water jet 35, thus giving it an amorphous structure.

The unit is fitted with a laser diffraction sensor 31, placed 300 mm below the second inductor 24. It allows the total diameter of the processed sheathed wire to be measured throughout the drawing process.

The invention claimed is:

1. A method for continuous processing of a metal wire sheathed in glass (10), comprising the steps of:
    inserting metal (12) into a glass tube (20);
    heating the metal until the metal melts inside the glass tube (20), at a lower part of the glass tube (20), so as to create a proceeding bead (14) at the lower part (21) of the glass tube (20) so as to soften the lower part of the glass tube (20); and
    drawing in a continuous manner an assembly comprising molten metal surrounded in glass, which came from the lower part (21) of the glass tube (20), whilst slowly lowering the glass tube (20) partially melted at the level of the lower part (21), as the glass tube (20) is consumed through the drawing of the obtained glass sheathed wire, characterised in that a heat resistant feed pipe (15) including an external diameter less than the internal diameter of the glass tube (20) is placed inside the glass tube (20) and filled with all of the metal needed to process a quantity of metal wire sheathed in glass (10), wherein the feed pipe (15) is inert as regards to the metal and includes a nozzle (13) at a lower part of the feed pine (15), wherein the nozzle (13) is positioned at a set distance from the lower part (21) of the glass tube (20) and in contact with the proceeding bead (14), thus allowing the formation of the proceeding bead (14) and permitting the dimensions of the proceeding bead (14) to remain substantially constant during the drawing of the wire, and using means of applying negative pressure within the feed pipe (15) to retain the metal (12) in the feed pipe (15), and then to release and regulate the negative pressure within the feed pipe (15) so as to provoke the start of the flowing of molten metal via the nozzle (13) and to control the continuous flow of the metal (12) throughout the drawing of the assembly.

2. The method according to claim 1, further comprising the step of circulating an inert gas between the feed pipe (15) and the glass tube (20).

3. The method according to claim 1, wherein the means of applying negative pressure is used to flush out inert gas inside the feed pipe (15) prior to melting the metal (12) in the feed pipe (15).

4. A device for continuous processing of a metal wire sheathed in glass (10), the device comprising:
    a glass tube (20) closed at a lower part (21);
    means of heating (23) to melt a metal mass (12) placed inside the glass tube (20) and to maintain a proceeding bead (14) in a liquid state softening the lower part (21) of the glass tube (20);
    a feed pipe (15) containing the metal mass (12) and including an external diameter that is less than an internal diameter of the glass tube (20), wherein the feed pipe (15) is configured such that the feed pipe (15) does not soften at the melting temperature of the metal mass (12), the feed pipe (15) including a nozzle (13) at a lower part of the feed pipe (15), wherein the feed pipe (15) is placed inside the glass tube (20) such that the nozzle (13) is positioned adjacent the lower part (21) of the glass tube (20);
    means of moving the glass tube (20) to make the glass tube (20) progressively descend as the glass tube (20) is consumed through a drawing of the wire; and
    means of applying negative pressure to the feed pipe (15) to create and manage a negative pressure within the feed pipe (15), so as to regulate and control the flow of a molten part of the metal mass (12).

5. The device according to claim 4, wherein the means of heating includes a first inductor (23) to heat the inside of the feed pipe (15) at the lower part of the feed pipe (15), over several centimeters of the feed pipe (15), thus constituting a first induction furnace.

6. The device according to claim 4, wherein the means of heating includes a second inductor (24), in the shape of a shell and placed below the lower part (21) of the glass tube (20).

7. The device according to claim 4, wherein the device is configured to circulate argon (32A, 32B) between the glass tube (20) and the feed pipe (15), the device further including a cable gland joint at an upper part of the glass tube (20) to create a leak-proof joint between the glass tube (20) and the feed pipe (15).

8. The device according to claim 7, further comprising means of flushing the glass tube (20) with an inert gas (32A, 32B).

* * * * *